3,218,882
SLIDE VALVE DETENT AND LOCKING DEVICE

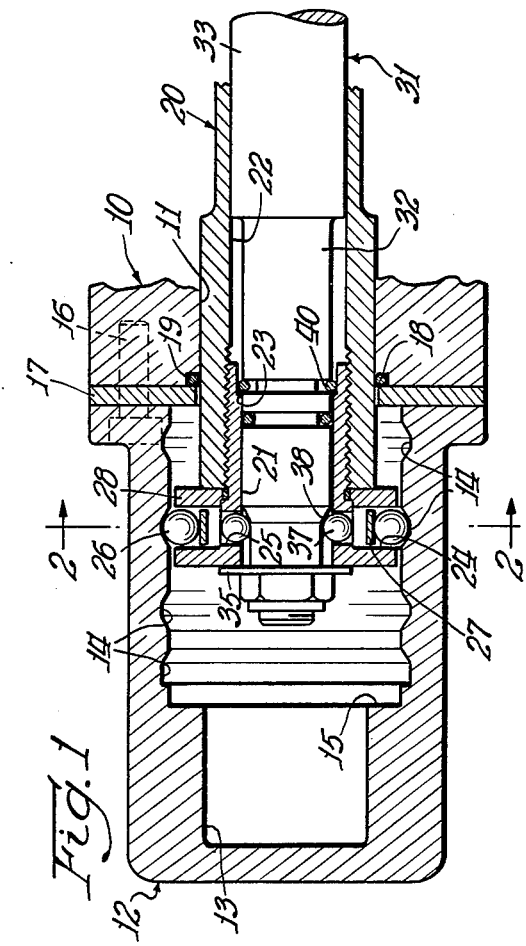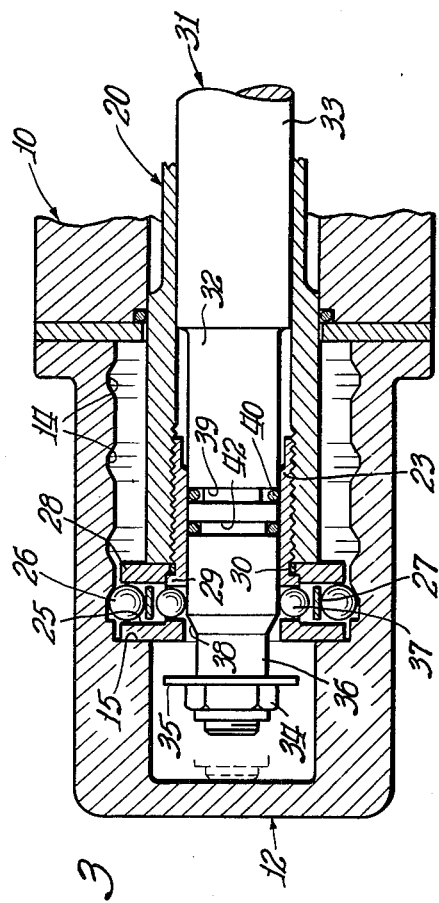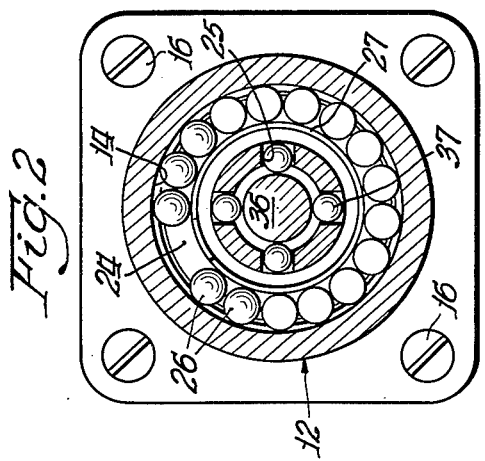

William T. Stephens, Palatine, and Leonard W. Szymanski, Niles, Ill., assignors to Borg-Warner Corporation, Chicago, Ill., a corporation of Illinois
Filed Oct. 2, 1963, Ser. No. 313,317
6 Claims. (Cl. 74—527)

The present invention relates to a slide valve detent device and more particularly to a device of this type wherein a full complement of balls is used. Employing a full complement of balls in a detent means is particularly useful in a spool valve. It lowers the unit loading per ball and therefore is an improvement over conventional means.

An additional feature of the present invention resides in the use of an inner and outer spool which normally move in unison. However means are provided whereby the inner spool may move independently thereby providing an additional functional use for the inner spool in a device of this type.

It is therefore an important object of the present invention to provide a slide valve detent device which lowers the unit loading per ball.

It is also an important object of the present invention to provide an improved slide detent device provided with an inner and outer spool which normally move in unison.

The invention consists of the novel constructions, arrangements and devices to be hereinafter described and claimed for carrying out the above stated objects and such other objects as will be apparent from the following description of a preferred form of the invention, illustrated with reference to the accompanying drawings, wherein:

FIGURE 1 is an elevational, longitudinal, sectional view, partially fragmentary, of the present invention;

FIGURE 2 is a cross section taken on line 2—2 of FIGURE 1, and;

FIGURE 3 is the same as FIGURE 1 except for the change in the spool position.

Referring now to the drawings, a valve body 10 is shown having a bore 11 therein. A cap 12 having a bore 13 therein provided with detent grooves 14 and a cap shoulder 15 is fastened to the valve body 10 by a suitable means such as bolts 16. An annular spacer 17 is interposed between the valve body 10 and the cap 12 in order to facilitate the insertion of an O-ring 18 or other suitable fluid sealing means in a groove 19 in the inner periphery of the bore 11.

Operable in the bores 11 and 13 is a spool 20 having a bi-dimensional bore therethrough comprising a relatively small bore 21 and a relatively large bore 22 whereby a tapered abutment 23 is provided. The forward end of the outer spool 20, which is larger in diameter than the remainder of the spool, is provided with an annular channel 24, the inner periphery of which is provided with openings 25 extending into the relatively small bore 21. Inserted in the annular channel 24 is a complement of outer balls 26 which are urged outwardly by an outer spool detent spring 27.

In the interest of expediency the spool 20 is made up of assembled parts. Basically the spool 20 comprises two sections, the forward section being threaded into the other sections as can be seen from the drawing thus enabling the completion of the annular channel 24 by assembling a flat ring 28 against an annular flange 29. During the assembling of parts, a suitable fluid sealing means, such as an O-ring 30 is inserted between the parts. The flat ring 30 thus becomes the rearward wall of the annular channel 24.

A compound inner spool 31 comprising a relatively small diameter 32 and a relatively large diameter 33 is reciprocable in the relatively small bore 21 and the large bore 22 respectively. The forward end of the relatively small diameter 32 of the compound inner spool 31 is provided with a nut 34 threaded thereon against a washer 35 which serves as a stop means to limit the rearward travel of the compound inner spool 31. The forward end of the relatively small diameter 32 is provided with a reduced diameter 36 on which the inner balls 37, carried in the openings 25, are operable. An inclined shoulder 38 serves to facilitate the movement of the inner balls 37 outwardly under certain conditions on the forward movement of the compound inner spool 31 hereinafter more fully explained. The relatively small diameter 32 of the compound inner spool 31 is provided with a groove 39 carrying an inner spool detent spring 40 which is operably associated with the tapered abutment 23 provided by the relatively small bore 21. A suitable fluid sealing means such as an O-ring 41 is carried in a groove 42 in the relatively small diameter 32 of the compound inner spool 31.

In operation when force is applied to the compound inner spool 31, it and the outer spool 20 normally move as a unit in either direction, depending on the direction of the force, into the various positions defined by the detent grooves 14. However when the outer spool 20 is in its extreme forward position it is blocked from further movement in that direction by the shoulder 15.

By applying additional force to the compound inner spool 31 in the same direction, the inner spool detent spring 40 will be compressed in the groove 39 by the tapered abutment 23 thereby permitting the compound inner spool 31 to move forward independently until stopped by the cap 12 as shown in the drawings. During this independent movement of the compound inner spool 31 the inner balls 37 will move over the inclined shoulder 38 into contact or close proximity to the outer spool detent spring 27 thus locking the complement of outer balls 26 in their detent annular groove 14 which thereby also locks the outer spool 20. This arrangement which provides independent movement of the compound inner spool 31 serves to provide an independent functional position of the inner spool 31 in a slide valve device.

When force is now applied to the compound inner spool 31 in the reverse direction, the outer spool 20 is prevented from moving because it is locked as shown above and this lock is not broken until the independent movement of the compound inner spool 31 is stopped by the washer 35 engaging the forward end of the outer spool 20. When this occurs, the various components described above in connection with the independent movement of the compound inner spool 31, return to their previous positions and the compound inner spool 31 and the outer spool 20 are in position to again move in unison into the various positions provided by the detent annular grooves 14.

While this invention has been described in connection with certain specific embodiments thereof, it is to be understood that it is by way of illustration and not by way of limitation and the scope of this invention is defined solely by the appended claims which should be construed as broadly as the prior art will permit.

We claim:
1. A slide valve detent device, comprising in combination:
  (a) a valve body having a first bore therein,
  (b) a cap connected to said valve body in axial alignment therewith having a second bore therein provided with annular grooves,
  (c) a spool operable in said bores comprising an inner spool and an outer spool, the force for operating said spool being applied to said inner spool,

(d) an annular channel in the forward end of said outer spool, (e) a complement of balls in said annular channel operably associated with said annular grooves, (f) an annular detent spring interposed between said complement of balls and the inner periphery of said annular channel urging said balls outwardly, (g) stop means limiting the forward movement of said outer spool, (h) releasable lock means associated with said inner spool and said outer spool, causing said inner spool to move in unison with said outer spool within the limits of said stop means and thereafter movable forwardly independent of said outer spool, and (i) means associated with said inner spool and said complement of balls whereby said outer spool is locked against rearward movement from its extreme forward position when said inner spool is moved rearwardly from its extreme forward position to the point where said releasable lock means is operable after which the said inner and outer spools again are in a position to move in unison.

2. A slide valve detent device, comprising in combination:

(a) a valve body having a first bore therein, (b) a cap connected to said valve body in axial alignment therewith having a second bore therein provided with annular grooves, (c) an outer spool operable in said first and second bores and having a third bore therethrough, (d) an annular channel in the forward end of said outer spool provided with openings in its inner periphery in communication with said third bore, said openings provided with balls, one each for each of said openings, (e) a complement of balls in said annular channel operably associated with said annular grooves, (f) an annular detent spring interposed between said complement of balls and the inner periphery of said annular channel urging said balls outwardly, (g) an inner spool operable in said third cylindrical bore having a reduced diameter provided with an inclined shoulder rearward thereof, said balls operably associated with said reduced diameter, (h) stop means at the forward end of said inner spool thereby limiting rearward movement with respect to said outer spool, (i) an annular shoulder provided with a radius in the inner periphery of said third bore, and (j) a snap ring spring in an annular groove in said inner spool operably associated with said annular shoulder.

3. A slide valve detent device according to claim 1 wherein the said spool is provided with fluid sealing means rearwardly of said complement of balls.

4. A slide valve detent device according to claim 2 wherein the said inner spool is provided with fluid sealing means rearwardly of said balls.

5. A slide valve detent device according to claim 2 wherein the said second bore is provided with a shoulder to serve as a stop means to limit the forward movement of said outer spool.

6. A slide valve detent device according to claim 2 wherein the outer end of said cap serves as a stop means to limit the forward movement of said inner spool.

References Cited by the Examiner
UNITED STATES PATENTS

| | | | |
|---|---|---|---|
| 3,045,498 | 7/1962 | Viezzoli | 74—527 |
| 3,093,158 | 6/1963 | Tennis | 251—297 |
| 3,128,677 | 4/1964 | Tennis | 251—297 |

BROUGHTON G. DURHAM, *Primary Examiner.*